United States Patent
Manaharlal Kakkad et al.

(10) Patent No.: US 11,361,211 B2
(45) Date of Patent: Jun. 14, 2022

(54) ARTIFICIAL INTELLIGENCE (AI) BASED CHATBOT CREATION AND COMMUNICATION SYSTEM

(71) Applicant: ACCENTURE GLOBAL SOLUTIONS LIMITED, Dublin (IE)

(72) Inventors: Hemant Manaharlal Kakkad, Mumbai (IN); Richa Gupta, Pune (IN); Nitin Kumar Gupta, Ghaziabad (IN)

(73) Assignee: ACCENTURE GLOBAL SOLUTIONS LIMITED, Dublin (IE)

(*) Notice: Subject to any disclaimer, the term of this patent is extended or adjusted under 35 U.S.C. 154(b) by 929 days.

(21) Appl. No.: 16/013,612

(22) Filed: Jun. 20, 2018

(65) Prior Publication Data
US 2019/0392285 A1 Dec. 26, 2019

(51) Int. Cl.
G06N 3/00 (2006.01)
H04L 51/02 (2022.01)
G06F 40/40 (2020.01)

(52) U.S. Cl.
CPC ............ G06N 3/006 (2013.01); H04L 51/02 (2013.01); *G06F 40/40* (2020.01)

(58) Field of Classification Search
CPC .......... G06N 3/006; H04L 51/02; G06F 40/40
USPC ......................................................... 706/11
See application file for complete search history.

(56) References Cited

U.S. PATENT DOCUMENTS

| 2004/0098358 A1* | 5/2004 | Roediger | G06N 5/00 706/46 |
| 2007/0203693 A1 | 8/2007 | Estes | |
| 2014/0316768 A1 | 10/2014 | Khandekar | |
| 2018/0337872 A1* | 11/2018 | Fawcett | G06F 16/3329 |
| 2019/0043106 A1* | 2/2019 | Talmor | G06N 20/00 |
| 2019/0188590 A1* | 6/2019 | Wu | H04L 51/02 |

OTHER PUBLICATIONS

Bapat, R., "Helping Chatbots to Better Understand User Requests Efficiently Using Human Computation", Master's Thesis, Delft University of Technology, the Netherlands, published 2017, 91 pages. <URL: https://pdfs.semanticscholar.org/a4af/5a6f2b54ad3e9cbe07f5a2c7d4dcc9247202.pdf>.

* cited by examiner

Primary Examiner — Sherrod L Keaton
(74) Attorney, Agent, or Firm — Mannava & Kang, P.C.

(57) ABSTRACT

A system for creating and managing an artificial conversational entity using an artificial intelligence (AI) based communications system is disclosed. The system may comprise a data access interface to receive instructions with configuration details from a requestor to create an artificial conversational entity, as well as data from a data source. The system may comprise a processor to generate the artificial conversational entity by: identifying a data source type associated with the data; performing data treatment on the received data based on the data source type in order to focus data on at least one targeted topic; determining and applying a compression technique to the received data; performing an intellective computing technique on the compressed data; performing a synoptic evaluation of the data; and generating an executable based on the synoptic evaluation. The executable may be associated with the artificial conversational entity to be presented to the user interacting with the artificial conversational entity.

20 Claims, 14 Drawing Sheets

ARTIFICIAL INTELLIGENCE (AI) BASED CHATBOT CREATION AND COMMUNICATION SYSTEM

TECHNICAL FIELD

This patent application relates generally to artificial intelligence (AI) based communication systems, and more specifically, to systems and methods for communication by creating and interacting with a custom artificial conversational entity.

BACKGROUND

"Chatbots" are becoming increasingly popular in enterprise and personal environments. For example, organizational entities are using chatbots to transform service delivery. In particular, chatbots are finding value in several enterprise endeavors, such as marketing and sales, project management, feedback, and vendor and supplier activities.

Although organizational entities are spending large amounts of money and resources to create and deploy chatbots across various segments to increase efficiencies, there are still several technical problems that continue to persist. One problem, for example, includes the increased consumption of chatbots. An increasing consumer base has placed tremendous pressure on existing customer care infrastructure and manpower, which has led to an upsurge in wait times and ticket resolution. Another problem is the lack of a standardized framework. In other words, there is an absence of automated standardized framework to create new chatbots in a more streamlined way. Conventional chatbot creation entails various distinct customizations based on business functions. But because each scenario typically has its own set of requirements, it becomes difficult to reuse existing chatbots across domains. Attempts to duplicate development efforts has often led to large amount of rework, all of which reduces efficiencies and overall productivity. Ironically, while chatbot creation and utilization were intended to help maximize productivity and minimize human effort, conventional systems and methods have unfortunately done the opposite.

Accordingly, a more robust approach for creating and interacting with chatbots or other custom artificial conversational entities may be imperative to overcome the shortcoming of conventional systems and methods.

BRIEF DESCRIPTION OF DRAWINGS

Features of the present disclosure are illustrated by way of example and not limited in the following Figure(s), in which like numerals indicate like elements, in which:

FIGS. 7A-7C illustrate screens for creating an artificial conversational entity in an artificial intelligence (AI) based chatbot creation and communications system, according to an example.

DETAILED DESCRIPTION

Figure 1:
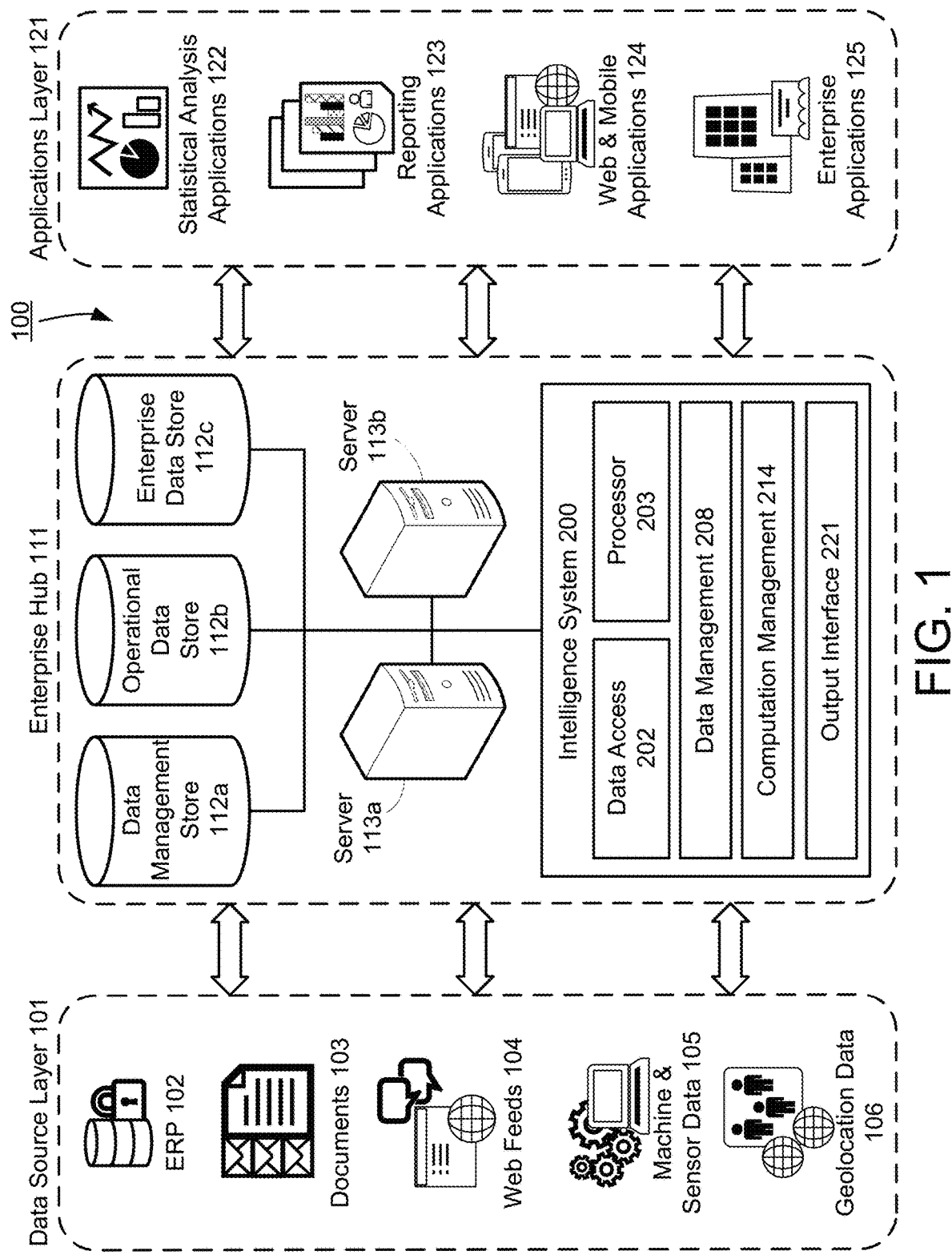
FIG. 1 illustrates an artificial intelligence (AI) based chatbot creation and communications system, according to an example.

For simplicity and illustrative purposes, the present disclosure is described by referring mainly to examples and embodiments thereof. In the following description, numerous specific details are set forth in order to provide a thorough understanding of the present disclosure. It will be readily apparent, however, that the present disclosure may be practiced without limitation to these specific details. In other instances, some methods and structures readily understood by one of ordinary skill in the art have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

A "chatbot" may have wide applicability in enterprise and personal environments. A chatbot may be a form of artificial conversational entity that may also be referred to as a talkbot, chatterbot, bot, instant messaging (IM) bot, social bot, interactive agent. Although examples described herein may be directed to "chatbots," it should be appreciated that the term may include any variety or form of artificial conversational entity.

As described above, the technical challenges facing creation and use of chatbots may include: increased consumption, lack of standardized framework, customizations based on business functions, and duplication of development efforts. The AI-based communications systems described herein may overcome these shortcomings and may help facilitate service delivery and customer engagement.

A chatbot may be created in several phases. These may include design, build, analytics, and maintenance. Chatbot design may include the process that defines interaction between user and chatbot. For example, a designer may shape a chatbot personality by configuring type of questions to be asked, overall interaction style, etc. Artificial intelligence may shape human-machine interaction in a way that makes it intuitive and natural. Design and testing may be similar to that of design and testing graphical user interfaces or other similar interface.

A chatbot build phase may be divided into understanding user's intent and producing the correct answers/responses to user queries. In other words, the first part may involve understanding user input. Using artificial intelligence, a chatbot may be built around a conversation using textual, auditory, or visual techniques. Such artificial intelligence may rely on computer hardware and software to convincingly simulate how a human would behave as a conversational partner. As a result, a chatbot may use sophisticated natural language processing (NLP) systems, using various techniques that involve machine learning, language translation, keyword scanning, pattern recognizing, clustering, and/or other AI-based or related techniques.

Chatbot analytics may allow a chatbot ability to take a wealth of information from a variety of data sources (e.g., Internet of Things (IoT), enterprise databases, etc.) and help monitor or spot potential flaws or problems. Chatbot analytics may also help improve human-machine interaction and overall user experience. Chatbot maintenance may help update chatbots according to current products and services. Artificial intelligence may help with self-learning, which may help reduce costs associated with required ongoing maintenance.

As described herein, improved techniques for artificial intelligence (AI) based communications system may reduce development effort, provide greater user control and accessibility, and enable cost and time effectiveness.

FIG. 1 illustrates an artificial intelligence (AI) based chatbot creation and communications system 100, according to an example. The AI-based communications system 100 may be used to create a chatbot and provide chatbot interactivity. In particular, the AI-based communications system 100 may provide ability for a user at an enterprise, for example, to create and deploy an artificial conversational entity with high efficiency and customizations. The AI-based communications system 100 may store information or be able to receive information from various data sources, as well as leverage artificial intelligence and other related machine learning techniques to create automated instances of chatbots for user experience and service and other related interactivity. For example, the AI-based communications system 100 may use natural language processing, interactive user interface, multi-lingual support, smart integration, visual/audio support, and/or other analytics and AI-based techniques to provision chatbots.

The AI-based communications system 100 may operate in a network or an enterprise environment where data is exchanged, and where products or services are being offered to customers. More specifically, the AI-based communications system 100 may provide real-time or near real-time monitoring and analysis of data exchange and data storage, as well as an artificial intelligence system that uses at least this data for the design, building, provisioning, analytics, and maintenance of chatbots. The enterprise environment of the AI-based communications system 100 may include a data source layer 101, an enterprise hub 111, and an applications layer 121. The data source layer 101 may include systems, subsystems, applications, and/or interfaces to collect information from enterprise resource planning (ERP) systems and applications 102 (hereinafter "ERP"), documents 103, web feeds 104, machine and sensor data 105 (hereinafter "sensor data"), and geolocation data 106, all of which may be distinct or integrated with the AI-based communications system 100. The data source layer 101 may include other data or information sources as well. It should be appreciated that each of these data sources may further include its own data feed, storage, system, application, or other source for collecting and sending data and information, including third party or indirect sources.

The ERP 102 may include one or more application servers that host various ERP applications. These may include, for example, a customer relationship management (CRM) platform, system, or application. The ERP 102 may collect, store, manage, and interpret data associated with various enterprise functions or activities. The ERP 102 may provide an integrated and continuously updated view of core business processes using common databases maintained by a database management system. The ERR 102 may track enterprise resources (e.g., cash, raw materials, production capacity, etc.) as well as other information, such as corporate or business transactions (e.g., orders, purchase orders, payroll, ticketing, etc.). Furthermore, the applications that make up the ERP 102 may share data across various departments (e.g., manufacturing, purchasing, sales, accounting, etc.) that provide the data. The ERP 102 may facilitate information flow between many enterprise functions and may manage communications with stakeholders or other outside parties. As a result; the ERP 102 may contain large quantities of information and data associated with a company and its employees.

The documents 103 may provide another source of data. Data received at the documents 103 may include files, emails, faxes, scans, or other documents that are transmitted, received, and stored in an enterprise environment.

The web feeds 104 may be yet another source of data. Data received at the web feeds 104 may include data from various web sources, such as websites, social media, syndication, aggregators, or from scraping. Websites may include uniform resource locator (URL) or other website identifier. This may also include RSS feeds, which allow users to access updates to online content. Data from social media may also include any type of internet-based application built upon creation and exchange of user-generated content, which may include information collected from social networking, microblogging, photosharing, news aggregation, video sharing, livecasting, virtual worlds, social gaming, social search, instant messaging, or other interactive media sources. Scraping may include web scraping, web harvesting, data scraping, or other techniques to extract data from websites or other Internet sources. These techniques may involve fetching (e.g., downloading content or data from a web page) and extraction (e.g., parsing, searching, reformatting, copying, compiling, monitoring, etc.) of data. Other forms of scraping may also include document object model (DOM) parsing, computer vision, and natural language processing (NLP) to simulate human browsing to enable gathering web page content for offline parsing.

The machine and sensor data 105 may be another source of data and information in an enterprise environment. For example, in an enterprise network, there may be physical devices, vehicles, appliances, and other enterprise systems that are equipped with electronics, software, and sensors, where most, if not all, of these items are within a network and share some measure of connectivity which enable these and other pieces of equipment to connect, communicate, and exchange data. This may allow various systems, objects, and items in an enterprise environment to be detected, sensed, or remotely controlled over one or more networks, creating a vast array of enterprise functionalities. These may include abilities to provide data analytics on equipment, assessment of equipment health or performance, improved efficiency, increased accuracy or function, economic benefit, reduction of human error, etc. By creating a "smarter" environment and leveraging interactivity between various pieces of equipment in an enterprise network, the machine and sensor data 105 may provide significant amounts of information and data that can be collected. Together with other technologies and systems, the machine and sensor data 105 may help enable the AI-based communications system 100 provide a more efficient way to create and deploy chatbots.

The geolocation data 106 may include information or data associated with identification or estimation of real-world geographic location of an object, such as a radar source, mobile device, or web-based computer or processing device. Geolocation data 106 may provide specific geographic coordinates or data that may be used for monitoring location, distinct or together with, other various positioning systems or applications. For example, the geolocation data 106 may include internet protocol (IP) address, media access control (MAC) address, radio-frequency identification (RFID), global positioning system (GPS), embedded software number, WiFi positioning system (WPS), device fingerprinting, canvas fingerprinting, etc. The geolocation data 106 may include other self-disclosing or self-identifying information, including but not limited to country, region county, city, postal/zip code, latitude, longitude, time zone, domain name, connection speed, internet service provider (ISP), language, proxies, or other information that can be used to piece together and trace location. This and other data in the data source layer 101 may be collected, monitored, analyzed, and/or incorporated with chatbot creation and deployment.

The enterprise hub 111 may collect, manage, process, and analyze information and data from the data source layer 101 and the applications layer 121. The enterprise hub 111 may be within general control of an enterprise, such as an organizational entity conducting operations, business, or other related activities. The enterprise hub 111 may design, build, and deploy and provide analytics and maintenance of chatbots that collect, manage, process, and analyze information and data from the data source layer 101 and the applications layer 121. In order to do this, the enterprise hub 111 may include one or more data stores, one or more servers, and other elements to process data for its organizational purposes. For example, the enterprise hub 111 may include a data management store 112*a*, an operational data store 112*b*, and an enterprise data store 112*c*. The data management store 112*a* may store information and data associated with data governance, assets, analysis, modeling, maintenance, administration, access, erasure, privacy, security, cleansing, quality, integration, business intelligence, mining, movement, warehousing, records, identify, theft, registry, publishing, metadata, planning, and other disciplines related to managing data as a value resource.

The operational data store 112*b* may store information and data associated with operational reporting, controls, and decision-making. The operational data store 112*b* may be designed to integrate data from multiple sources for additional operations on that data, for example, in reporting, controls, and operational decision support. Integration of data at the operational data store 112*b* may involve cleaning, resolving redundancy, checking against business rules, and other data integration techniques, such as data virtualization, federation, and extract, transform, and load (ETL). The operational data store 112*b* may also be a source of data for an enterprise data store 112*c*, which may be used for tactical and strategic decision support.

The enterprise data store 112*c* may store information and data associated with reporting and data analysis, and may be instrumental to various business intelligence functions. For example, the enterprise data store 112*c* may be one or more repositories of integrated data (e.g., from the operational data store 112*b*) and used to store current and historical data and to create analytical report(s) for advanced enterprise knowledge. Data passed through the enterprise data store 112*c* may also involve cleansing to ensure data quality and usage. ETL may also be used, as well as other techniques, involving staging, data integration, and access features. Ultimately, data in the enterprise data store 112*c* may be transformed and catalogued so that it may be used for data mining, analytics, and other business intelligence purposes, such as marketing, decision support, etc. Other data stores may also be provided in the enterprise hub 111, such as data marts, data vaults, data warehouses, data repositories, etc.

It should be appreciated that the data stores described herein may include volatile and/or nonvolatile data storage that may store data and software or firmware including machine-readable instructions. The software or firmware may include subroutines or applications that perform the functions of the system 100 and/or run one or more application that utilize data from the system 100. Other various server components or configurations may also be provided.

The enterprise hub 111 may further include a variety of servers 113*a* and 113*b* that facilitate, coordinate, and manage information and data. For example, the servers 113*a* and 113*b*, as well as others described herein, may include any number or combination of the following servers: exchange servers, content management server, application servers, database servers, directory servers, web servers, security servers, enterprise servers, and analytics servers. Other servers to provide data security and protection may also be provided.

The enterprise hub 111 may also include an intelligence system 201. The intelligence system 201 may include various layers, processors, systems or subsystems. For example, the intelligence system 201 may include a data access interface 202, a processor 203, a data management subsystem 208, a computation management subsystem 214, and an output interface 222. Other layers, processing components, systems or subsystems, or analytics components may also be provided. It should be appreciated that the data management 208 and computation management 214 may be other processing components integrated or distinct from processor 203 to help facilitate data processing, especially for chatbot creation and deployment, by the intelligence system 201 as described herein. Features and functionalities may be particularly helpful in data management and machine learning.

There may be many examples of hardware that may be used for any of the servers, layers, subsystems, and components of the intelligence system 201 or the AI-based communications system 100 described herein. For example, the processor 203 may be an integrated circuit, and may execute software or firmware or comprise custom processing circuits, such as an application-specific integrated circuit (ASIC) or field-programmable gate array (FPGA). The data access interface 202 and output interface 221 may be any number of hardware, network, or software interfaces that serves to facilitate communication and exchange of data between any number of or combination of equipment, protocol layers, or applications. For example, the data access interface 202 and output interface 221 may each include a network interface to communicate with other servers, devices, components or network elements via a network in the AI-based communications system 100. More detail of the intelligence system 201 is provided in FIG. 2.

The AI-based communications system 100 may also include an applications layer 121. The applications layer 121 may include any number or combination of systems and applications that interface with users or user-interfacing tools in an enterprise or a personal environment. For example, the applications layer 121 may include statistical analysis applications 122, reporting applications 123, web and mobile applications 124, and enterprise applications 125.

The statistical analysis applications 122 may include systems or applications that specialize in statistical calculations or econometrics. These may include, but not limited to, those by Tableau®, Domo®, Salesforce®, JMP®, MATLAB®, QlikSense®, SPSS®, SAS®, Stata®, Alteryx®, Analytica®, etc. The reporting applications 123 may include systems or applications that that provide reporting, for example, in business intelligence, visualization, and other useful enterprise reporting tools. These may include, but not limited to, Dundas BI®, Domo®, Sisense®, Yellowfin®, Sharepoint®, SAP®, etc.

The web and mobile applications 124 may include Internet-based or mobile device based systems or applications of various users, namely those in an enterprise environment. The enterprise applications 125 may include systems or applications used by an enterprise that is typically business-oriented. For example, these may include online payment processing, interactive product cataloguing, billing systems, security, enterprise content management, IT service management, customer relationship management, business intelligence, project management, human resource management, manufacturing, health and safety, automation, or other similar system or application. In an example, these enterprise applications 125 may be external or remote to the enterprise hub 111.

It should be appreciated that a layer as described herein may include a platform and at least one application. An application may include software comprised of machine-readable instructions stored on a non-transitory computer readable medium and executable by a processor. The systems, subsystems, and layers shown in FIG. 1 or other figure may include one or more servers or computing devices. A platform may be an environment in which an application is designed to run on. For example, a platform may include hardware to execute the application, an operating system (OS), and runtime libraries. The application may be compiled to run on the platform. The runtime libraries may include low-level routines or subroutines called by the application to invoke some of behaviors, such as exception handling, memory management, etc., of the platform at runtime. A subsystem may be similar to a platform and may include software and hardware to run various software or applications.

It should be appreciated that a single server is shown for each of the servers 113a and 113b, and/or other servers within the systems, layers, and subsystems of the AI-based communications system 100, as described herein. However, it should be appreciated that multiple servers may be used for each of these servers, and the servers may be connected via one or more networks. Also, middleware (not shown) may include in the AI-based communications system 100 as well. The middleware may include software hosted by one or more servers, or it may include a gateway or other related element. Furthermore, it should be appreciated that some of the middleware or servers may or may not be needed to achieve functionality. Other types of servers, middleware, systems, platforms, and applications not shown may also be provided at the back-end to facilitate the features and functionalities of the AI-based communications system 100.

The AI-based communications system 100, as described herein, may provide several benefits and advantages over conventional techniques. For example, the AI-based communications system 100 may leverage power of artificial intelligence and other features to provide users with ease of creation and interaction with chatbots. For instance, natural language processing (NLP) may provide human-like conversations and understanding. The AI-based communications system 100 may also provide chatbots with interactive user interfaces that provide a seamless user experience. The AI-based communications system 100 may also provide multilingual support, which allows creation of and interaction with chatbots in a global platform. The AI-based communications system 100 may also provide speech-to-text or text-to-speech techniques, as well as other multimodal ways to create and interact with users—internal, external, or otherwise. Smart integration may also give chatbot ability to provide informed responses based on a wealth of various data sources, such as existing customer website, documents, various databases, $3^{rd}$ party ticketing systems, social media, etc.

Auto-correction and user dictionaries may also be provided. Here, user input verification may be used to correct user statements and inputs. A custom dictionary for a set of common reference words may be provided to better understand a user's intent during a conversation. This may help provide the most natural and logical response to user queries. Furthermore, the AI-based communications system 100 may provide a user the ability to select context of discussion from a list of available functions, not to mention a feedback mechanism for responses provided by the chatbot. Such feedback may be useful for training chatbots and improve future results and responses. It may also be possible to configure a limited lifespan for each chatbot, as well as store entire conversations for future reference and/or training.

The AI-based communications system 100 may be platform independent. In other words, chatbots created by the AI-based communications system 100 may be created and/or deployed across various platforms, such as Windows, MAC, Unix, or other operating systems. Chatbots created by the AI-based communications system 100 may also be hosted in the cloud, provisioned/accessed via the web, or provided locally/remotely via on-site premises. Ultimately, the AI-based communications system 100 may provide a more robust and comprehensive approach for artificial intelligence (AI) based communications system that reduces development effort, provides greater user control and accessibility, and enables cost and time effectiveness.

Figure 2:
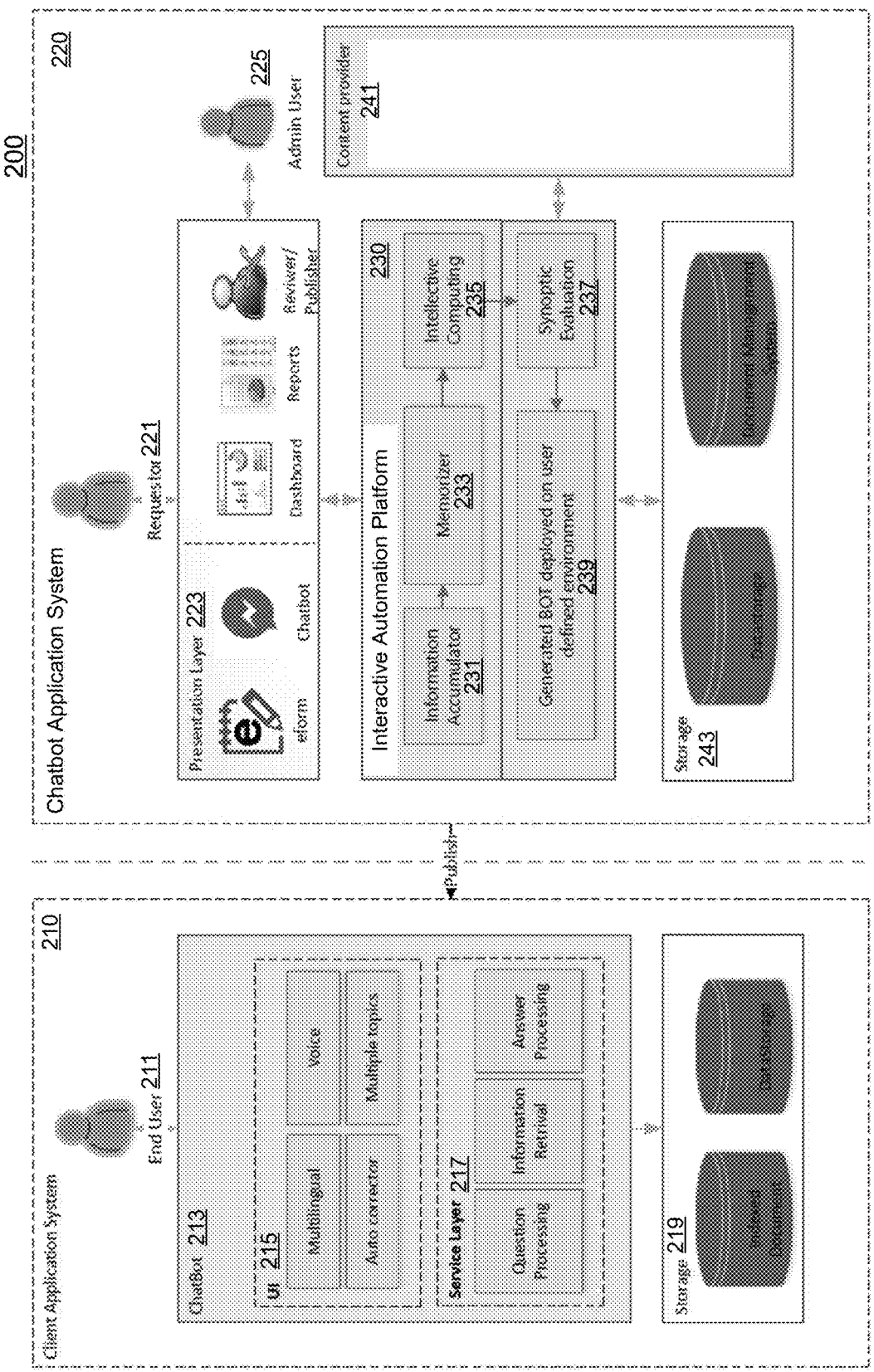
FIG. 2 illustrates a block diagram for artificial intelligence (AI) based chatbot creation and communications system, according to an example.

FIG. 2 illustrates a block diagram for artificial intelligence (AI) based chatbot creation and communications system, according to an example, according to an example. As depicted, the system 200 may include a client application system 210 and a chatbot application system 220. The client application system 210 may be where an end user 211 interacts with a chatbot 213 (or other artificial conversational entity) published by the chatbot application system 220. The chatbot 213 may include a user interface 215 and a service layer 217. The user interface 215 may include various user interface elements, such as multilingual, voice, auto-correction, multiple topic capabilities, etc. Other various user interface elements to provide natural user interactivity may also be provided. The service layer 217 may include question processing, information retrieval, answer processing, and/or other service element to facilitate interaction with the end user 211. The chatbot 213 may be connected to one or more data storage 219. These may include indexed documents or other data storage.

The chatbot application system 220 may where a requestor 222 creates a chatbot. For example, the requestor 222 may be a user at an enterprise that wants to create a chatbot 213 for interactivity for an end user 211 at the client application system 210. The chatbot application system 220 may include a presentation layer 223 and an interactive automation platform 230. The presentation layer 223 may include a variety of features with which the requestor 222 may select or provide to create the chatbot 213. For example, the presentation layer 223 may include various tools, such as an eform, a chatbot, a dashboard, reporting, and/or reviewer/publisher capabilities. Other various presentation elements may be provided. It should be appreciated that an administrator or admin user 225 may also interact with the presentation layer 223 to determine what presentation elements may be available for the requestor 222, as well as provide technical maintenance and troubleshooting.

The interactive automation platform 230 may be a platform that creates the chatbot 213. For example, the interactive automation platform 230 may be performed by the intelligence system 201 and/or processor 203 of the enterprise hub 111 of FIG. 1. The interactive automation platform 230 may include an information accumulator 231, a memorizer 233, intellective computing 235, synoptic evaluation, and generated bot deployment 239. The interactive automation platform 230 may receive data from a variety of content providers or data sources 241. These may include at least data from data source layer 101 and/or application layer 121 of FIG. 1, as well as various servers or sources, such as a ticketing server or other server. The interactive automation platform may also be connected to one or more data storage 243. These may include document management or other data storage.

Figure 3A:
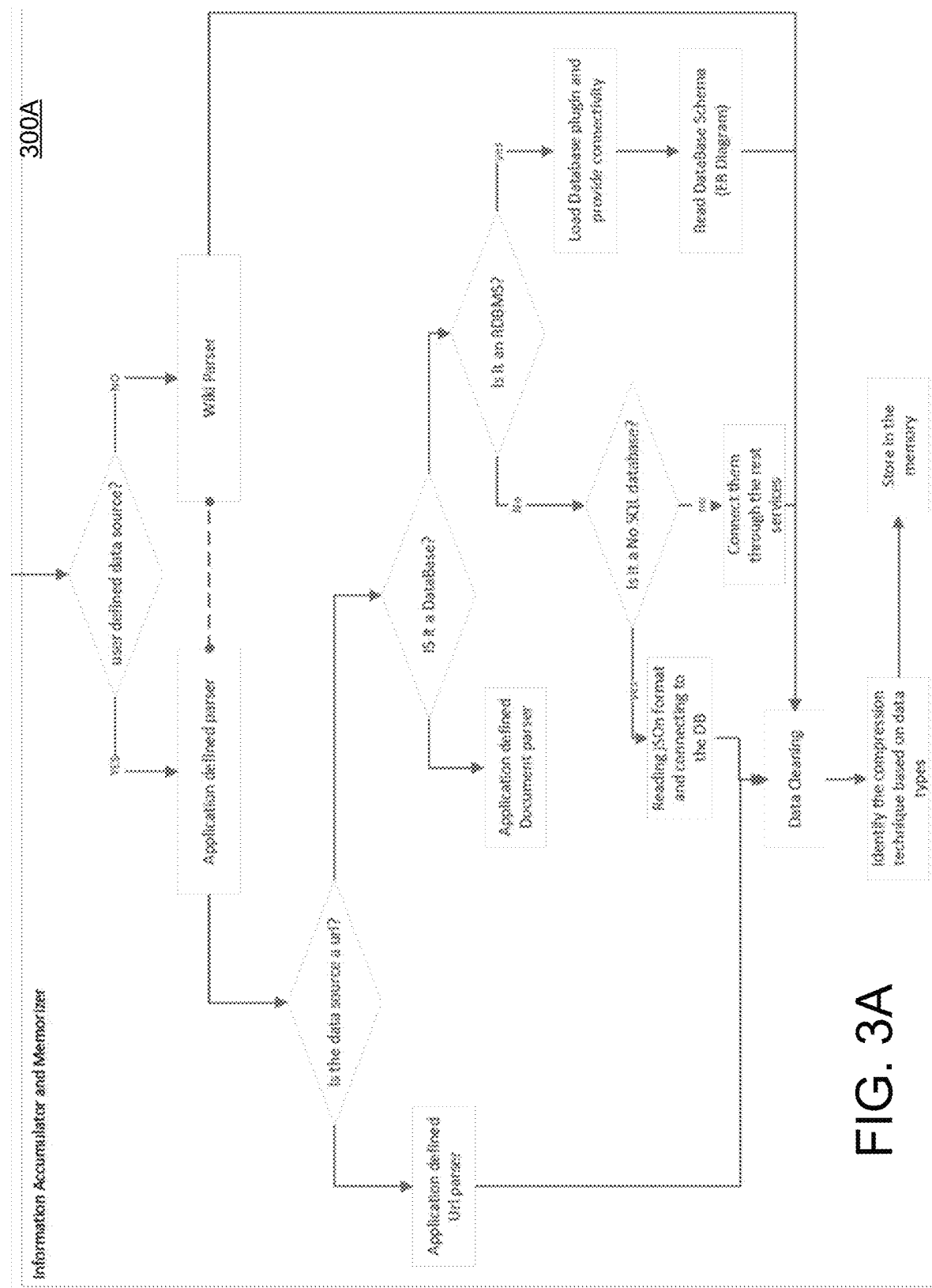
FIG. 3A illustrates a decision tree for an information accumulator and memorizer in an artificial intelligence (AI) based chatbot creation and communications system, according to an example.

The information accumulator 231 and the memorizer 233 may help facilitate data transmission from a data source. For example, FIG. 3A illustrates a decision tree 300A for an information accumulator 231 and a memorizer 233 in an artificial intelligence (AI) based chatbot creation and communications system 100, according to an example. The information accumulator 231 may handle data from a variety of data sources in a variety of formats. For instance, this may include URL, PDF, Word, text files, database file format, or other data formats. The information accumulator 231 may gather, measure, and process data or other information on one or more targeted topics. The information accumulator 231 may help ensure that data gathered is defined and accurate. Other various types of data or data sources may also be provided.

The memorizer 233 may choose appropriate data compression techniques to avoid consumption of space in disk or memory. The memorizer 233 may perform one or more data encryption techniques to help maintain data accuracy and consistency. Based on data accumulated by the information accumulator 231, the memorizer 233 may create its own defined library of data and may optionally store it in one or more data stores. Using self-learning capabilities, the memorizer 233 may also be able to identify slang, abbreviations, or other alternative word constructions to learn their meanings.

Referring back to decision tree 300A of FIG. 3, one example of the information accumulator 231 and the memorizer 233 gathering and processing data may be shown. At the start of the decision tree, the information accumulator 231 may determine whether there is a user defined source. If not, a wiki parser may be used as a default and data would head straight for data cleaning. If there is a user defined source, the decision tree 300A may the determine what other type of data source (e.g., URL, database, etc.) and then identify an application defined parser or other data processing technique before being data cleaned as well. Once the data is cleaned (or formatted for further use), the memorizer 233 may identify one or more compression techniques based on various data types of the data, which may then be stored for immediate or future use.

Figure 3B:
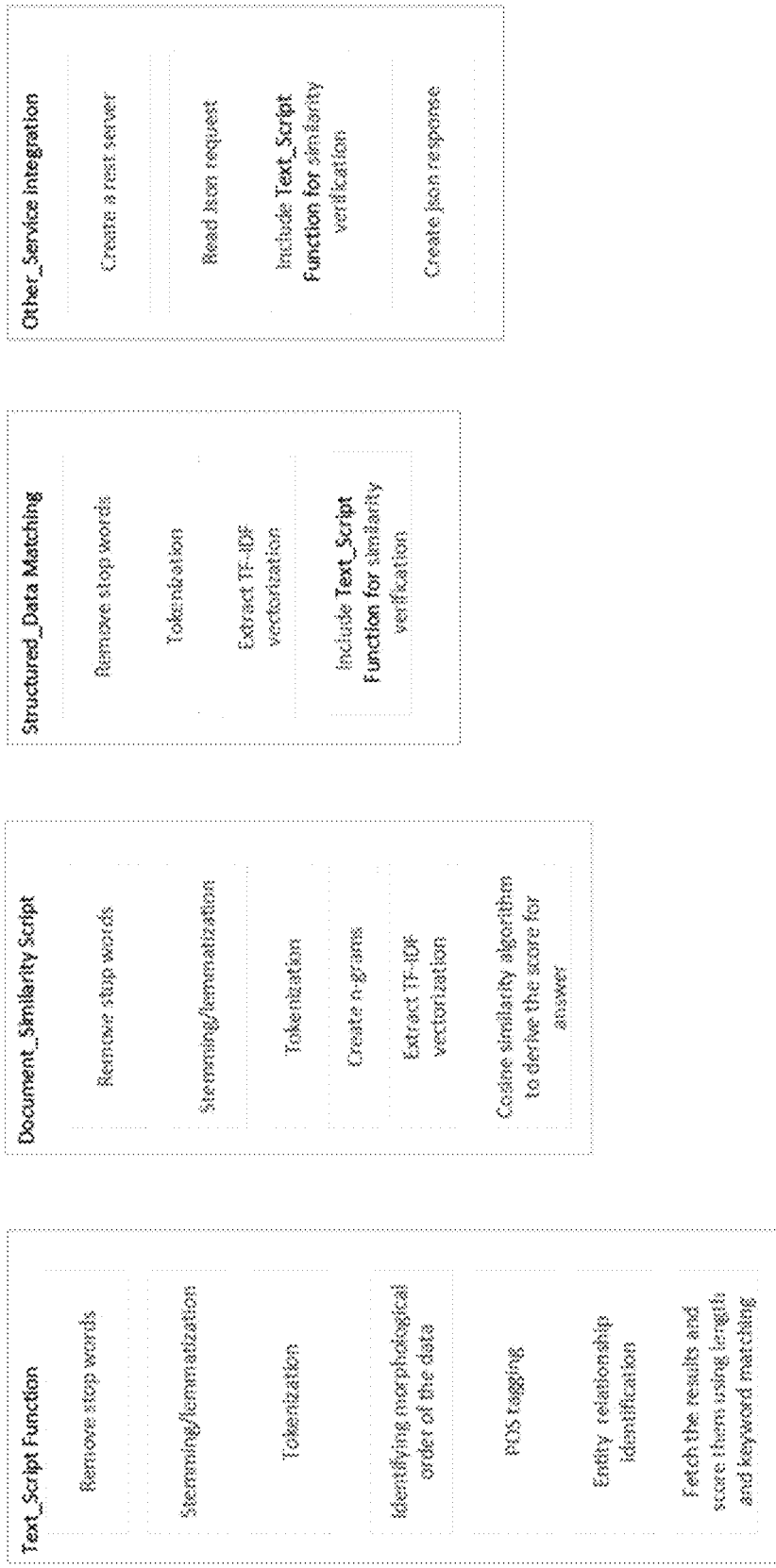
FIG. 3B illustrates a block diagram for intellective computing in an artificial intelligence (AI) based chatbot creation and communications system, according to an example.

FIG. 3B illustrates a block diagram 300B of intellective computing 235 in an artificial intelligence (AI) based chatbot creation and communications system 100, according to an example. In an example, intellective computing 235 may provide data processing and chatbot creation and interactivity. For instance, intellective computing 235 may reformulate chatbot queries and translate it into meaning information. Intellective computing may remove common keywords and comprehend underlying meaning of queries. Intellective computing 235 may also decide appropriate searching mechanism to retrieve answer(s) or response(s) to user queries. Intellectively computing may rely on a variety of data processing techniques. These may include, but not limited to, tokenization, word extraction or parsing, relation extraction, weighting, ranking, clustering, knowledge graphs, and other machine learning or AI-based techniques.

Figure 3C:
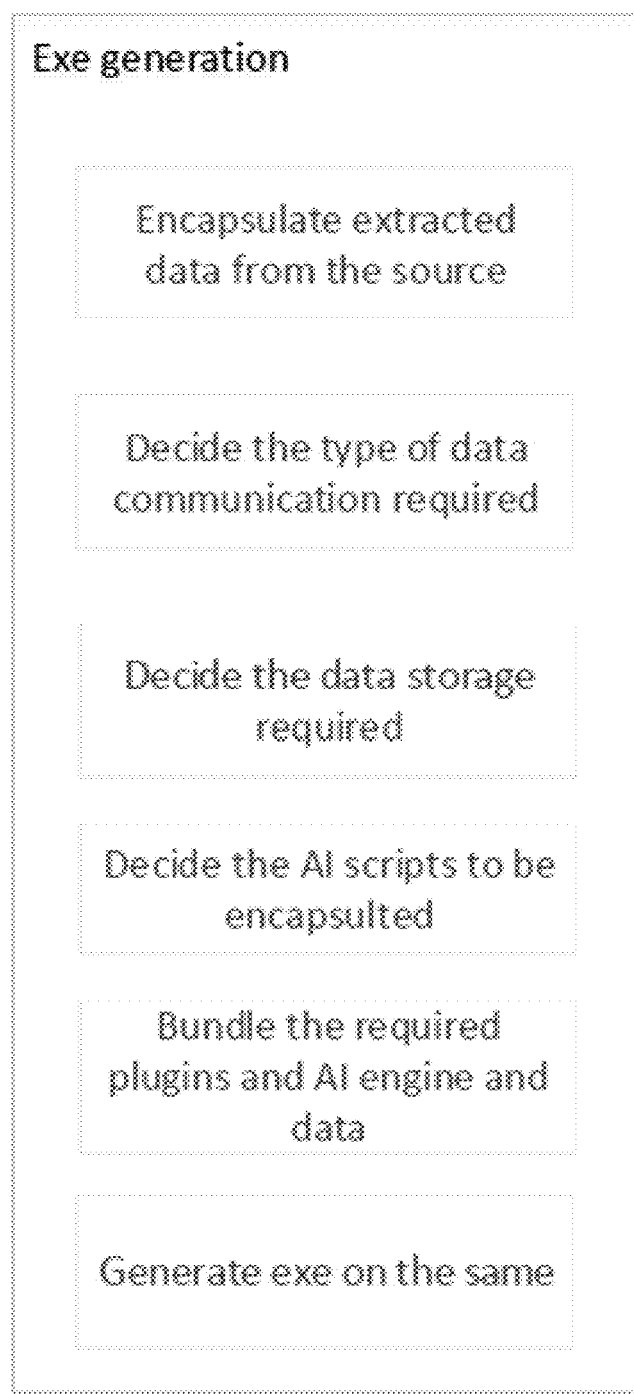
FIG. 3C illustrates block diagram for synoptic evaluation in an artificial intelligence (AI) based chatbot creation and communications system, according to an example.

FIG. 3C illustrates a block diagram 300C for synoptic evaluation 237 in an artificial intelligence (AI) based chatbot creation and communications system 100, according to an example. The synoptic evaluation 237 may be performed by the processor 203 of FIG. 1. In one example, this may include conducting estimation of libraries (e.g., python or other data/language) required to run the chatbot application. The synoptic evaluation 237 may also include compiling data bank with libraries to yield deployable executable file. It should be appreciated that the synoptic evaluation 237, among other things, may encapsulate extracted data from the data source, decide type of data communication needed, decide the data storage required, decided the scripts (e.g., AI-base scripts) to be encapsulated, bundle plugins, etc. The chatbot may then be generated as an executable file for deployment 239 at an end user environment. Other variations for synoptic evaluation may also be provided.

Figure 4:
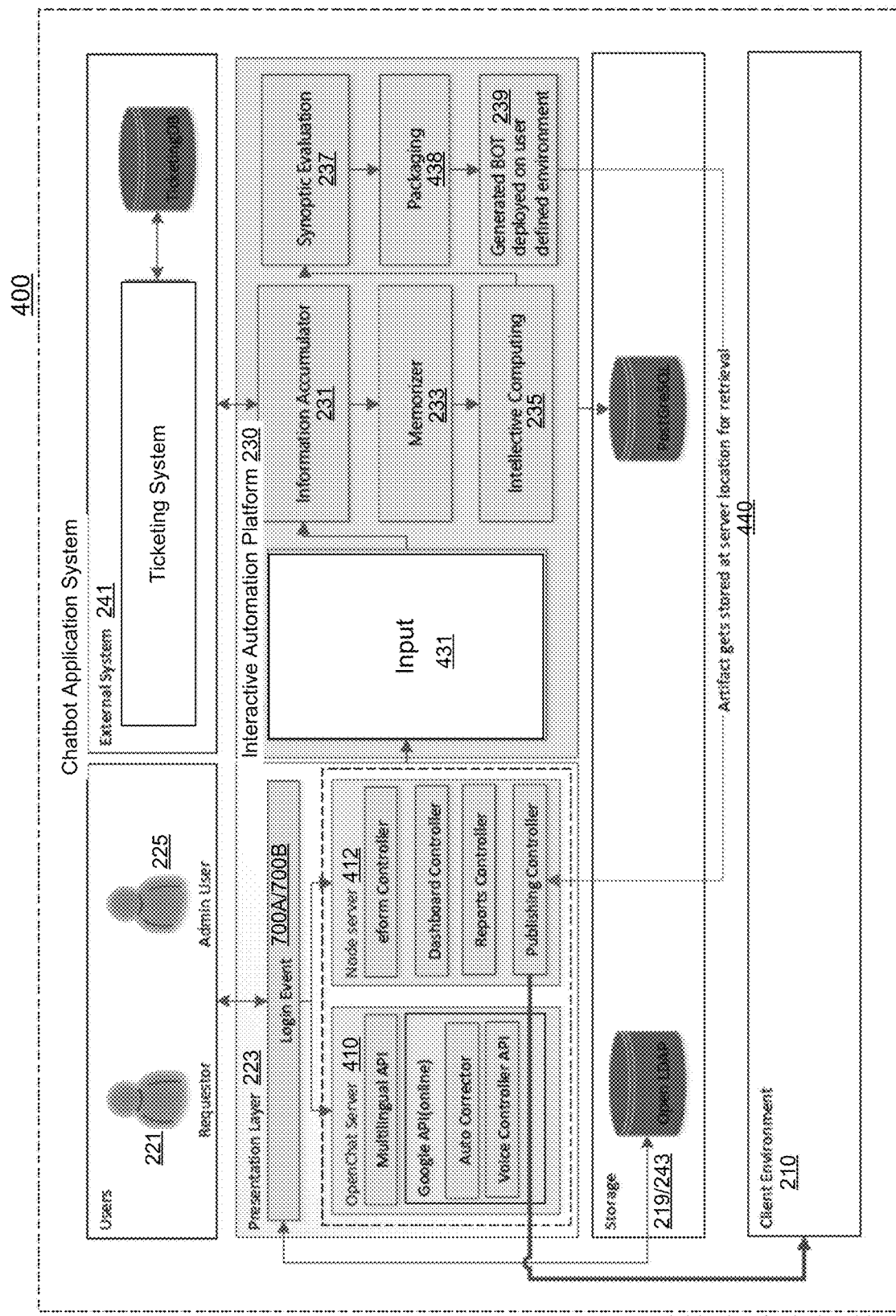
FIG. 4 illustrates a data flow for creation of an artificial conversational entity, according to an example.

FIG. 4 illustrates a data flow 400 for creation of an artificial conversational entity, according to an example. In order to interact with a chatbot or artificial conversational entity, a user 211 may interact with a presentation layer 223. The presentation layer 223 may include a login event, as shown in 700A or 700B of FIGS. 7A and 7B, respectively. Once registered or logged in, the user 211 may interact with various application program interfaces (APIs) or servers, such as an openchat server 410. The openchat server 410, for example, may include a multilingual API, as well as other APIs for autocorrection, auto suggestion, voice control, etc. Other various APIs may also be provided to facilitate chatbot interactivity and functionality.

Once the user begins to interact with the chatbot, this may occur via a rest service 510 of a server, such as a flask web server 512, where the interactive automation platform 230 may reside. In an example, the interactive automation platform 230 may also interact with various external systems 241, as described above. The interactive automation platform 230 may include various interactive elements for comprehensive and custom functionality. These may include spell checking or auto-correction 522, as well as identify intent 534 and question and answer 536 components. Identifying intent 534 may include stemming, lemmatization, tokenization, morphological order, part-of-speech (POS) tagging, entity relationships, length or keyword matching score, etc. Question and answer 536 may include stemming, lemmatization, tokenization, stop words removal, n-grams, extraction, vectorization, cosine similarity scoring, JavaScript Object Notation (JSON) response creation, etc.

Figure 5:
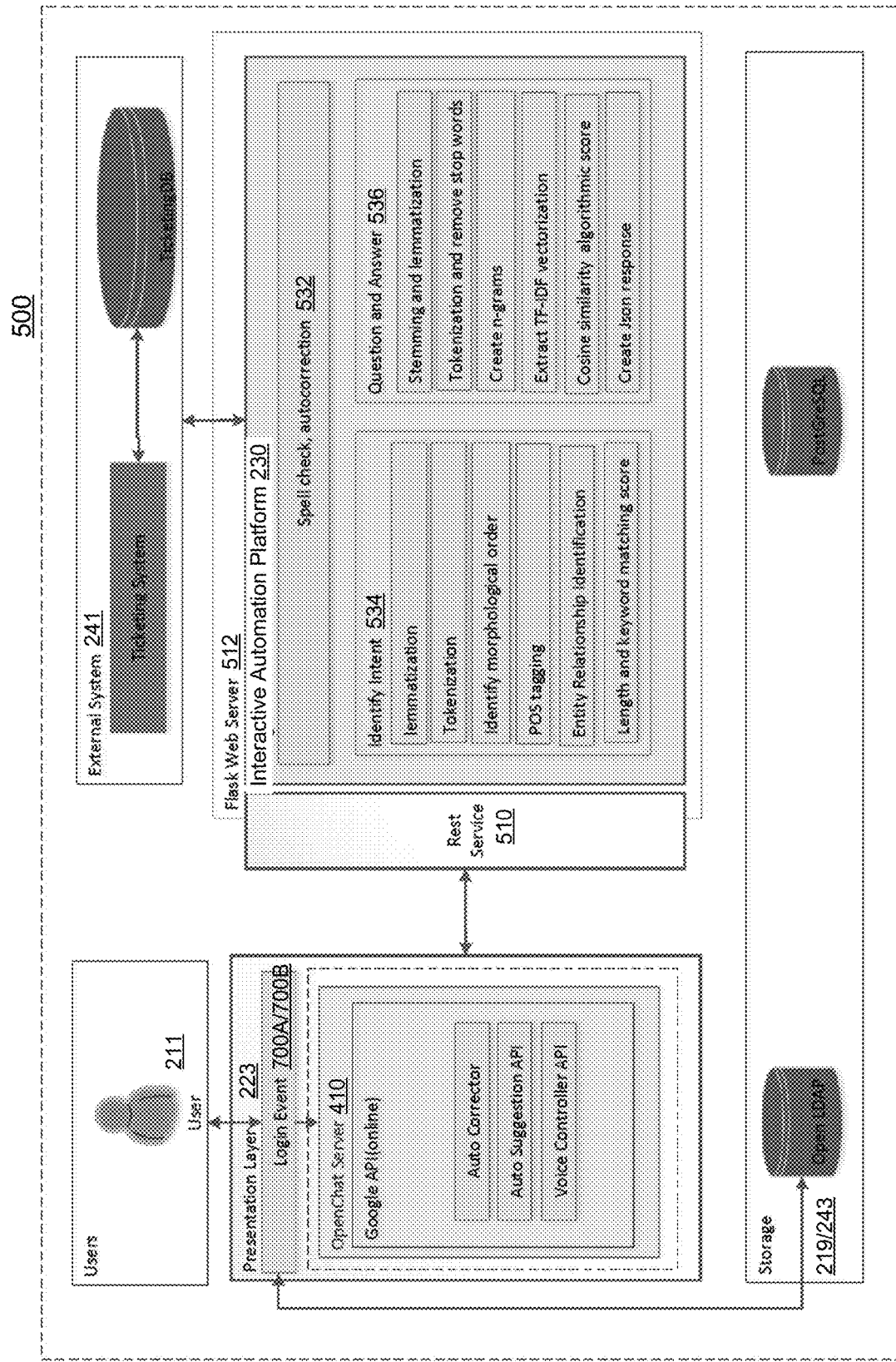
FIG. 5 illustrates a data flow for interaction with an artificial conversational entity, according to an example.

FIG. 5 illustrates a data flow 500 for interaction with an artificial conversational entity, according to an example. In order to create a chatbot or artificial conversational entity, a user such as a requestor 222 or administrator 225 may interact with a presentation layer 223 to initiate creation. The presentation layer 223 may include a login event, as shown in 700A or 700B of FIGS. 7A and 7B, respectively. Once registered or logged in, the user may interact with various APIs or servers, such as an openchat server 410 and/or a node server 412. The openchat server 410, for example, may include a multilingual API, as well as other APIs for autocorrection, voice control, etc. The node server 412 may include various controllers, such as eForm, dashboard, reports, publishing, and/or other controllers as described herein.

Once the user provides details or configuration of the chatbot, the interactive automation platform 230 may interact with various external systems 241, as described above, and receive these details or configuration information at an input 431. The data may flow through the information accumulator 231, memorizer, intellective computing 235, synoptic evaluation 237, and packaging 438 to generate and deploy a chatbot for the user defined environment. In an example, the generated bot may also include artifacts that get stored at one or more server locations for future retrieval. In one example, this data may be pushed to or received at the publishing controller of the node server 412 to be presented at the client environment 210.

Figure 6A:
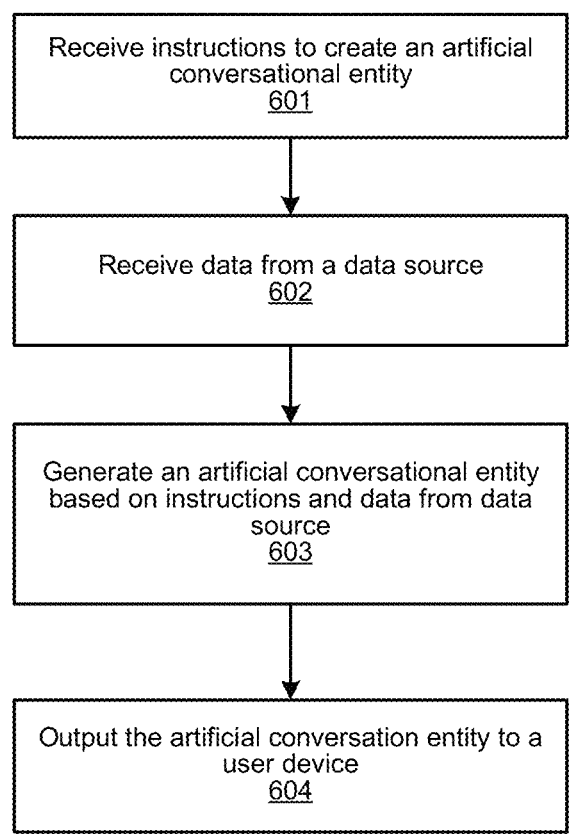
FIG. 6A illustrates a flow chart of a method for creation of an artificial conversational entity, according to an example.

FIG. 6A illustrates a flow chart of a method for creation of an artificial conversational entity 600A, according to an example. The method 600A is provided by way of example, as there may be a variety of ways to carry out the method described herein. Although the method 600A is primarily described as being performed by system 100 as shown in FIG. 1 or system 200 as shown in FIG. 2, according to data flow of FIG. 3, the method 600A may be executed or otherwise performed by other systems, or a combination of systems. Each block shown in FIG. 6A may further represent one or more processes, methods, or subroutines, and one or more of the blocks may include machine-readable instructions stored on a non-transitory computer readable medium and executed by a processor or other type of processing circuit to perform one or more operations described herein.

At block 601, the data access interface 202 may receive instructions from a requestor 222 to create an artificial conversational entity. In an example, the instructions may include artificial conversational entity configuration details.

At block 602, the data access interface 202 may receive data from a data source. In an example, the data source may include at a user-defined data source and/or a default data source. The data source may include a website, a document, enterprise resource planning (ERP) system, a database, a web feed, a sensor, a geolocation data source, a server, an analytics tool, a mobile device, a reporting system, or other data source.

At block 603, the processor 203 may generate an artificial conversational entity based on the instructions from the requestor and the data from the data source. The processor 203 may identify a data source type associated with the data received from the data access interface 202.

The processor 203 may perform data treatment on the received data based on the data source type. The data treatment may focus data on at least one targeted topic. The data treatment may include parsing, natural language processing, relation extraction, translation, auto-correction, data cleaning, etc.

The processor 203 may determine and apply a compression technique to the received data based on data type, e.g., via memorizer 233. The compression technique comprises performing data encryption to maintain accuracy and consistency of data.

The processor 203 may perform an intellective computing technique on the data, e.g., via intellective computing 235. The intellective computing technique may include translating user queries received from a user interacting with the artificial conversational entity to meaningful information. The intellective computing technique may include removing common keywords to understand intent of user queries. The intellective computing technique may include determining key search terms for responding to user queries. In an example, determining key search terms may include tokenization, extraction, weighting keywords, relation extraction, ranking potential responses to user queries, etc.

The processor 203 may perform a synoptic evaluation of the data. The synoptic evaluation may include conducting an estimation of libraries required to run the artificial conversational entity. The synoptic evaluation may include compiling the one or more data stores with required libraries to run the artificial conversational entity.

The processor 203 may generate an executable based on the synoptic evaluation. The executable may be associated with the artificial conversational entity to be presented to the user interacting with the artificial conversational entity.

At block 604, the output interface 221 may output to a user device the artificial conversational entity with which to interact. The artificial conversational entity, for example, may provide AI-based communications platform to a user and answer his or her questions using techniques described herein.

Figure 6B:
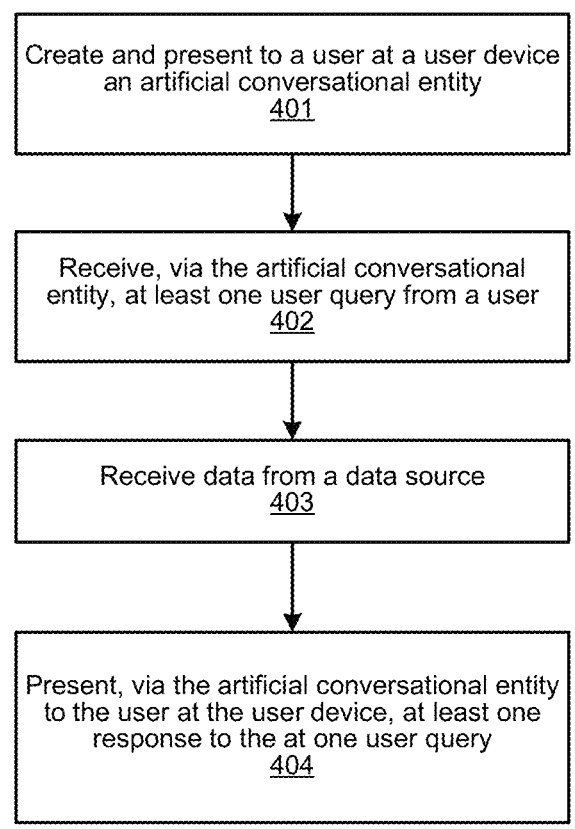
FIG. 6B illustrates a flow chart of a method for providing an artificial conversational entity, according to an example.

FIG. 6B illustrates a flow chart of a method for providing interaction with an artificial conversational entity 600B, according to an example. The method 600B is provided by way of example, as there may be a variety of ways to carry out the method described herein. Although the method 600B is primarily described as being performed by system 100 as shown in FIG. 1 or system 200 as shown in FIG. 2, according to data flow of FIG. 4, the method 600B may be executed or otherwise performed by other systems, or a combination of systems. Each block shown in FIG. 6B may further represent one or more processes, methods, or subroutines, and one or more of the blocks may include machine-readable instructions stored on a non-transitory computer readable medium and executed by a processor or other type of processing circuit to perform one or more operations described herein.

At block 651, the processor 203 may create and present, via the output interface 221, to a user at a user device an artificial conversational entity with which a user may interact. The artificial conversational entity, for example, may provide AI-based communications platform to a user and answer his or her questions using techniques described herein.

For example, at block 652, the data access interface 202 may receive via the artificial conversational entity, at least one user query from the user. At block 653, the data access interface 202 may receive data from a data source. The data source may include at least one of a user-defined data source and a default data source. The artificial conversational entity may be generated by the based at least in part on the data source. In an example, the data source comprises at least one of a website, a document, enterprise resource planning (ERP) system, a database, a web feed, a sensor, a geolocation data source, a server, an analytics tool, a mobile device, a reporting system, and/or other data source.

At block 654, the processor 203 may present, at the output interface 221 via the artificial conversational entity to the user at the user device, at least one response to the at least one user queries. In some examples, the at least one response may be generated by identifying a data source type associated with the data received from the data access interface, performing data treatment on the received data based on the data source type, performing an intellective computing technique on the data to identify intent of the at least query, and generate the at least one response based on the identified intent and the received data. It should be appreciated that the data treatment may focus data on at least one targeted topic. In an example, the data treatment may include parsing, natural language processing, relation extraction, translation, auto-correction, data cleaning, and/or other data treatment technique.

The intellective computing technique may include translating user queries received from a user interacting with the artificial conversational entity to meaningful information. The intellective computing technique may include removing common keywords to understand intent of user queries. The intellective computing technique may include determining key search terms for responding to user queries, wherein determining key search terms comprises at least one of tokenization, extraction, weighting keywords, relation extraction, and ranking potential responses to user queries. Other various intellective computing techniques may also be provided.

In an example, generating the at least one response based on the identified intent and the received data may include using stemming, tokenization, stop word removal, n-grams, extraction, vectorization, knowledge graphs, cosine similarity, algorithmic scoring, JSON creation, entity relations, etc. Other various techniques to generate a real-time or near real-time response to user queries may also be provided.

Figure 7A:
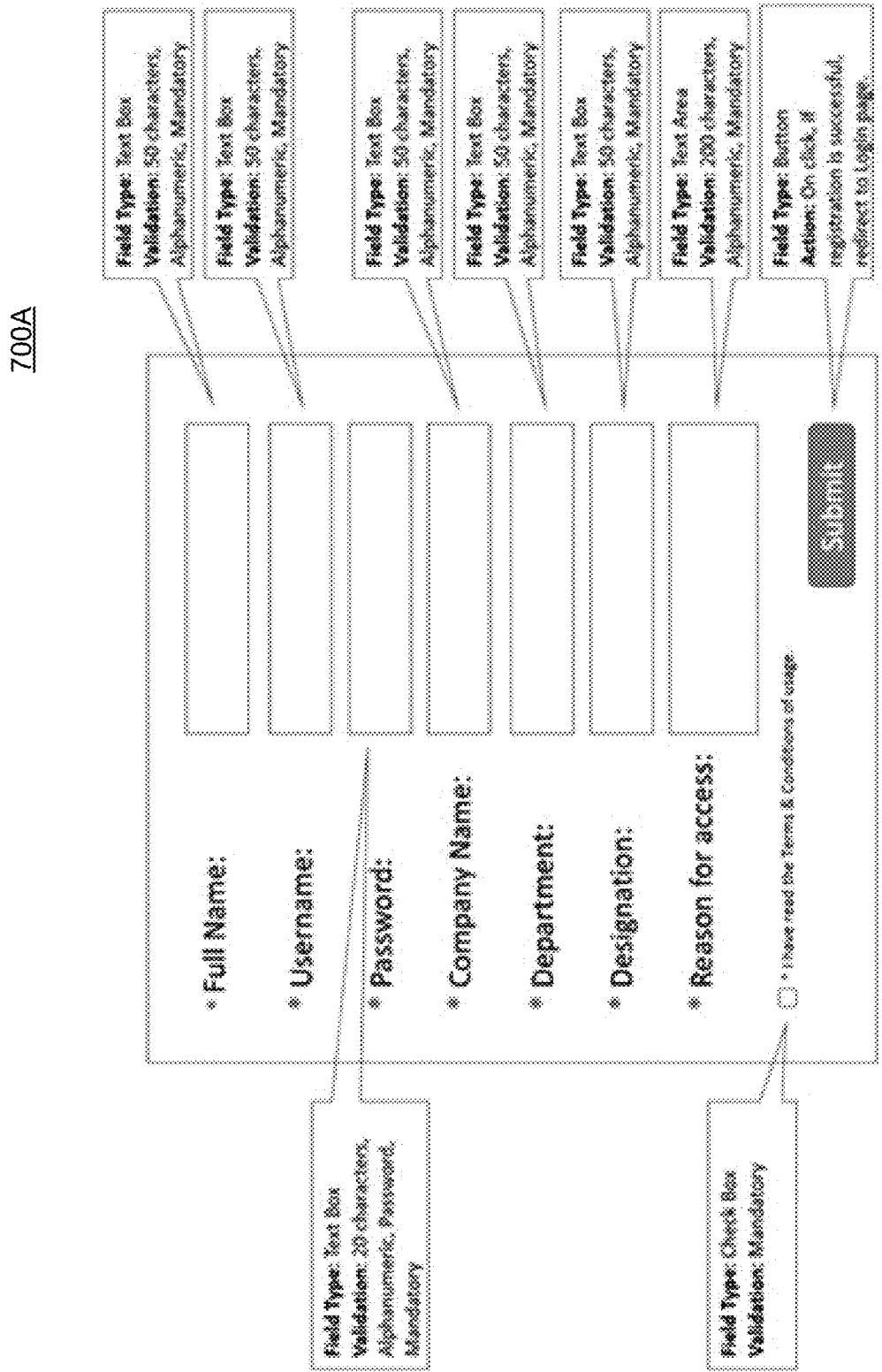
Figure 7B:
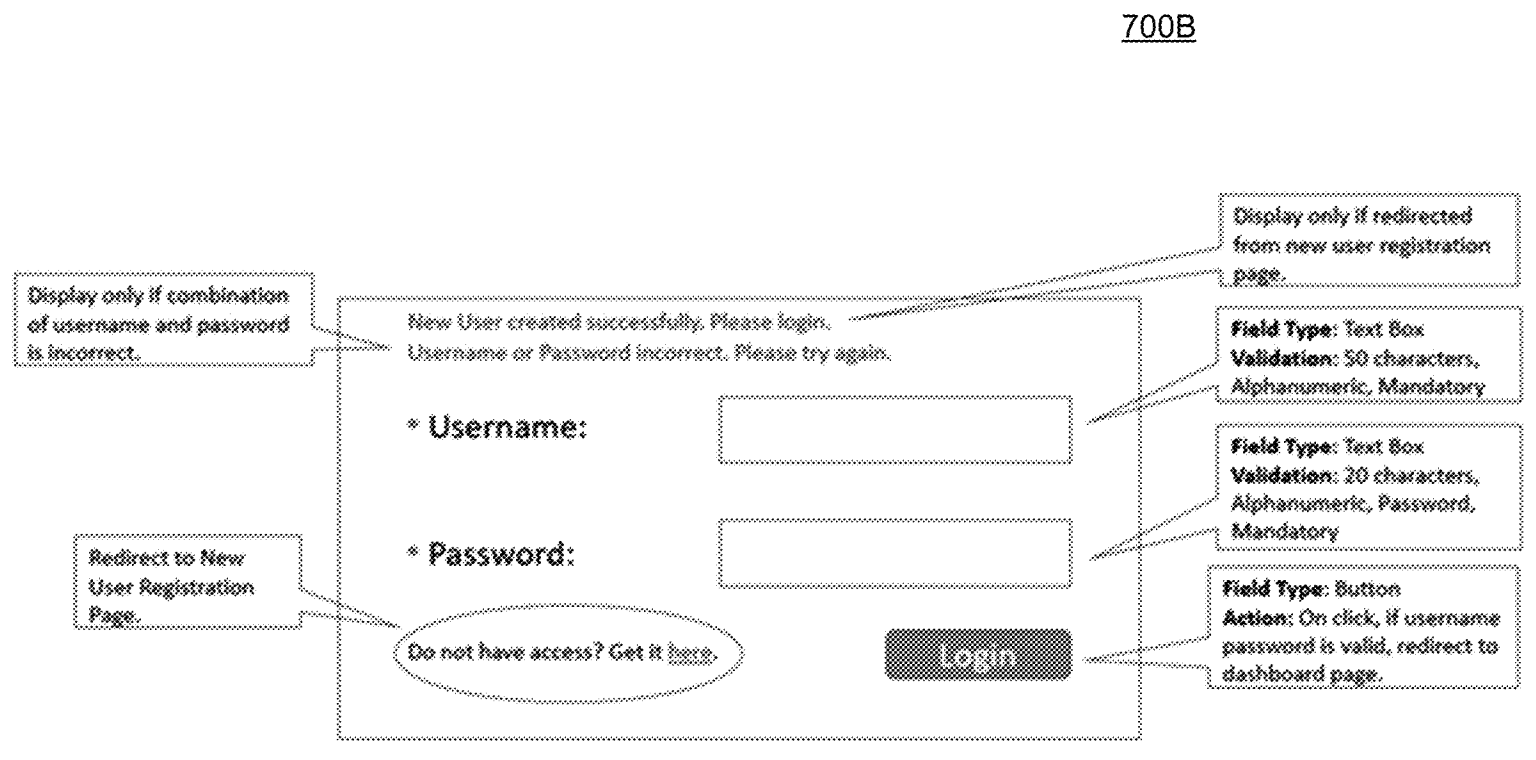
Figure 7C:
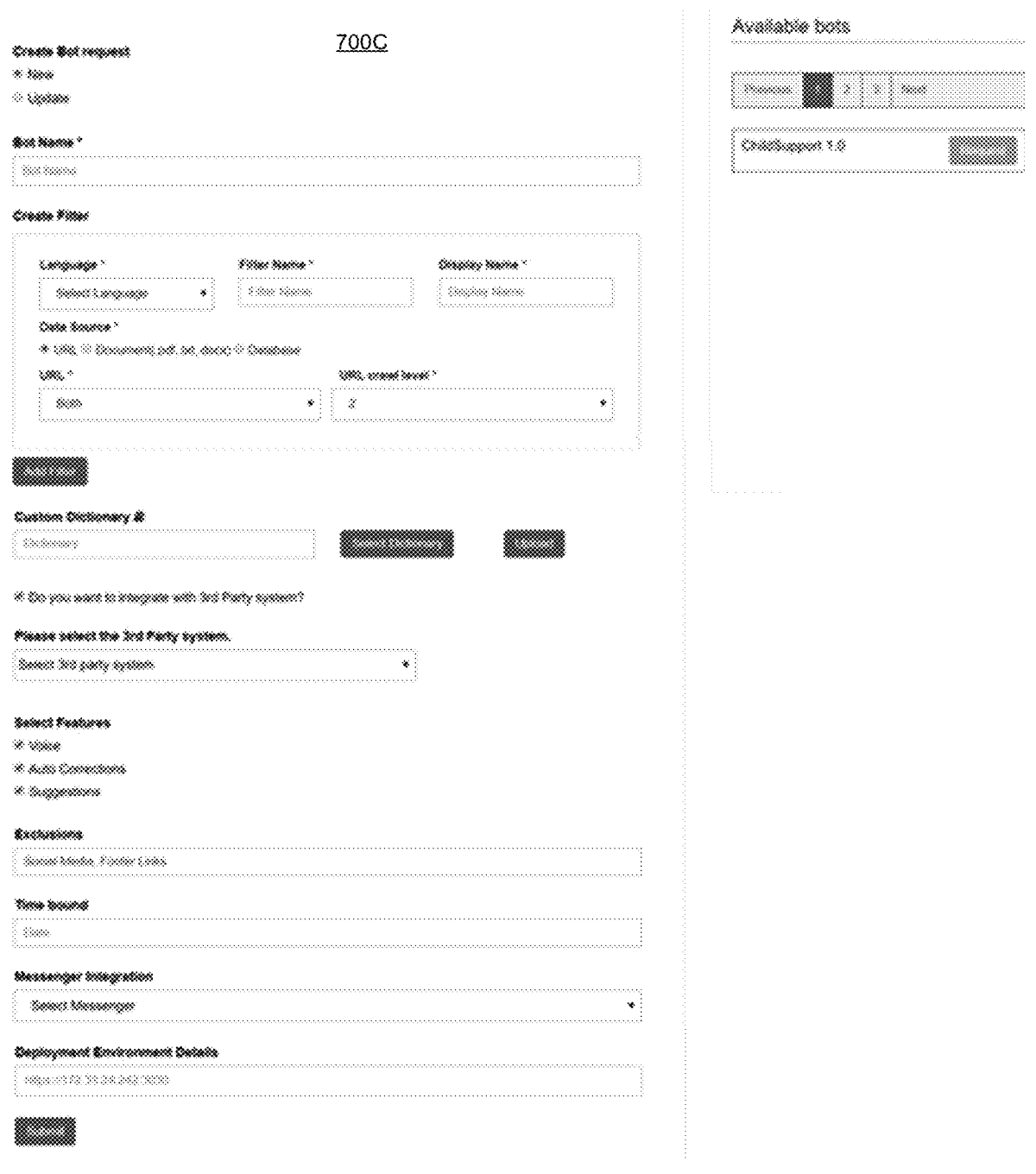

FIGS. 7A-7C illustrate screens for creating an artificial conversational entity in an artificial intelligence (AI) based chatbot creation and communications system, according to an example. For example, FIGS. 7A-7B illustrate screens 700A-700B for logging in an artificial intelligence (AI) based communications system, according to an example. In FIG. 7A, an organizational entity may create an automated instance of a chatbot and deploy it on their servers. Deployed instances of the chatbot may be used by employees (internal) or by its customers (external). As shown, a screen 700A for new user registration may be shown. This screen 700A may be used to create a new user profile. Registration may include receiving a name, username, password, company name, department, designation/title, reason for access or other input. There may also be a button for accepting Terms & Conditions of usage to ensure legal compliance.

In FIG. 7B, a login screen 700B may be provided. Herein, a registered user may access the artificial intelligence (AI) based communications system 100 by entering his or her username and password. The system may receive these credentials and allow the user access. While username and password is depicted, it should be appreciated that other various login techniques may be provided. For example, this may include two-point access, pattern, email, telephone number, PIN, fingerprint, facial recognition, iris/retina, biometrics, or combination thereof. Other techniques for registration and login access may be provided.

FIG. 7C illustrates a screen 700C for creating and configuring an artificial conversational entity in an artificial intelligence (AI) based communications system, according to an example. As shown, a registered user may be able to select a new chatbot or update an existing one. The chatbot name may be created and filtered based several selectable or user-defined filters. In an example, the user may select a particular language, filter name, display name, data source (e.g., URL), crawl level, etc. It should be appreciated that a URL type may be wiki-based, user-defined, combination, or other. The URL crawl level may represent a depth of a website at with the chatbot will get data and may be configurable to the nth degree. Multiple URL address may be applied as well.

Several filters may be applied. A user may click on "add" filter to add filters in a tabular format. Custom dictionaries may also be included to enhance conversational and user experience. A user may also select integration with a $3^{rd}$ party system. For example, a pull-down may be provided for the user to select. These may include $3^{rd}$ party systems, such as Jira, Service Now, or other ERP. Other various configurable features may also be set, such as voice, auto-correction, suggestions, exclusions, lifespan, message app integration, as well as other configurable details.

It should be appreciated that the screen 700C may also have a section for user preferences. This may be previously saved settings to other popular settings. For example, of these may include settings for data source, downloadable executable files, size of executable files, port details, etc.

Figure 8A:
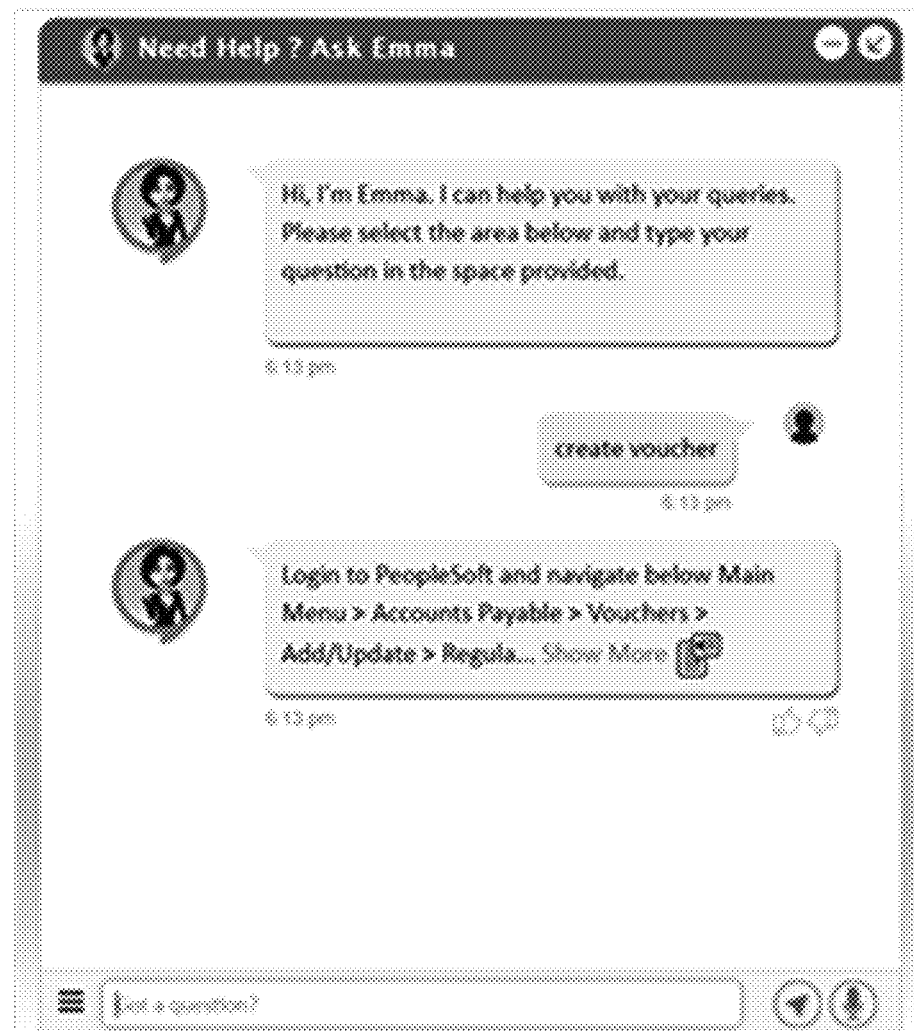
FIGS. 8A-8B illustrate screens for interacting with an artificial conversational entity in an artificial intelligence (AI) based chatbot creation and communications system, according to an example.
Figure 8B:
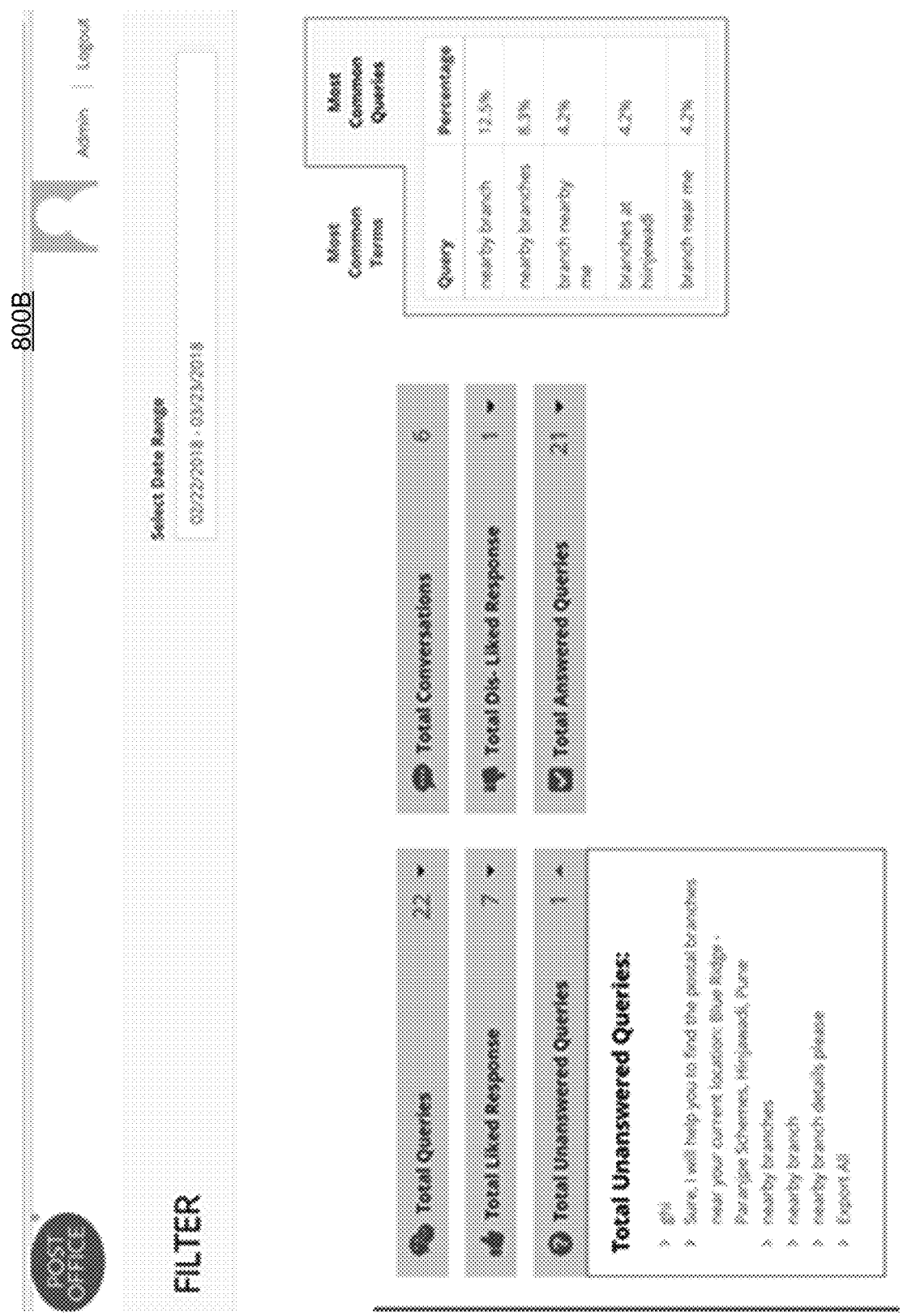

FIGS. 8A-8B illustrate screens for interacting with an artificial intelligence (AI) based communications system, according to an example. FIG. 8A illustrates a screen 800A for a graphical user interface (GUI) for interacting with an artificial intelligence (AI) based communications system, according to an example. It should be appreciated that the GUI may be configurable and customized based on various selections and options. In an example, there may be a "like" or "dislike" feature that allows the user interacting with the chatbot to provide feedback to the responses. If "like" or "dislike" is chosen, for example, a weightage may be applied to that answer and be used to improve self-learning. It should also be appreciated that the chatbot may have a humanized form. In an example, the chatbot may be named "Emma" or other human or relatable name, as shown in FIG. 8A.

FIG. 8B illustrate a screen 800B for a dashboard graphical user interface (GUI) an artificial intelligence (AI) based communications system, according to an example. The dashboard may provide real time or near real time insights of the effectiveness of the artificial intelligence (AI) based communications system. As shown, a number of metrics, analytics, analysis, and/or options may be provided by the dashboard. For instance, an administrator or requestor may view a total number of queries, each of them in detail if desired. The user may also view all the liked or disliked responses, as well as any unanswered queries. Other options may include date, time, common queries, common terms, etc.

Chatbot creation and deployment may involve processing data. Data may be multimodal. Audio or visually-oriented data (e.g., a digital image video), for example, may require additional processing. For instance, this may also include processing metadata associated with that digital image. As needed, pattern recognition may be applied during image processing to detect a particular object or pattern in the image. Different types of conventional machine learning functions may be used for pattern recognition.

The intelligence system 201, according to various examples, may build and train multiple machine learning classifiers as well. These may include convolutional neural networks (CNNs). The machine learning classifiers may perform image/textual processing to detect particular attributes of interested images/text. Such attributes may be used for image/textual matching to identify visual or textual content. It should be appreciated that "visual" or "image" data, as described herein, may also include textual data, audio data, or video data as well. In other words, "visual data processing" or "image processing," as used herein, may include, without limitation, processing and analysis of multimodal information. For example, this may include processing of textual, audio, video, or other similar data in addition to the actual visual or image data.

Referring back to convolutional neural networks (CNNs), CNNs may include many layers to detect, parse, and understand data, e.g., intent or meaning of data. Furthermore, each layer of the CNN may have a multitude of parameters associated with it. Specific values of those parameters for a successful and accurate data classification may not be known a priori. The intelligence system 201, according to various examples, may provide a method for building and training CNNs to output an accurate classification of data for purposes of creating intuitive artificial conversational entities or chatbots.

Multiple CNNs may be built and trained by a machine learning processing system. According to an example, a CNN built and trained by a machine learning processing system may include a CNN. The CNN may identify and determine one or more phrases and match against other similar phrases or characters to determine meaning, context, or intent. Together with other data sources, such as dictionaries, thesaurus, reference materials, etc., a more robust and self-learning system may be provided to better understand user queries and provide natural AI-based responses.

As discussed in more detail herein, the CNN may be able to identify particular attributes of the data which may be used for chatbot creation and deployment. This may be particular helpful in understanding meaning of user queries and other processing and analysis. Furthermore, the CNN may operate in real-time or near real-time to facilitate accurate matching or classification objects from data. Accordingly, together with natural language processing (NLP) and/or other processing techniques, a machine learning processing system may be used to create and deploy a human-like experience in an artificial conversational entity.

Other helpful applications may be provided by the examples described herein. For example, natural language processing (NLP) and auto-tagging process. The NLP and auto-tagging may be used to enhance textual processing and user query intent determinations. For example, the processing systems described herein may be "trained" by submission of more training data, e.g., gathered from similar chatbot creation and interaction. Using user intent and the additional search attributes, the system may perform enhanced processing and matching as well as an auto-tagging process. Once a sufficient amount of data is obtained from one or more users, the system may also use that information to acquire other information from third party sources to build a data library. All of this may enhance chatbot creation and interaction. Accordingly, the system described herein may facilitate an improved and interactive method for creating and deploying artificial conversational entities and improve user experience and service.

It should also be appreciated that the AI-based communications system 100 may also provide other components not shown. These may include gateways, servers, or other interfaces that may perform and run analytics in order to decrease time, expense in data delivery, and perhaps even taking immediate action at equipment. In many ways, the system 100 may then provide real-time or near real-time analytics to simplify the analytics process and increase responsiveness and efficiency.

It should be appreciated that the components of the system 100 described herein may operate in partial or full capacity, or it may be removed entirely. It should also be appreciated that data analytics and processing techniques described below with respect to the analytics system, for example, may also be performed partially or in full by other various components of the overall system.

It should be appreciated that the data stores described herein may include volatile and/or nonvolatile data storage that may store data and software or firmware including machine-readable instructions. The software or firmware may include subroutines or applications that perform the functions of the AI-based communications system 100 and/or run one or more application that utilize data from the AI-based communications system 100. Other various server components or configurations may also be provided.

There may be several examples of hardware that may be used for the servers, layers, subsystems, and components of the intelligence system 201 or the AI-based communications system 100. For example, the processor may comprise an integrated circuit, and may execute software or firmware or comprise custom processing circuits, such as an application-specific integrated circuit (ASIC) or field-programmable gate array (FPGA). The data access interface 202 and output interface 221 may be any number of hardware, network, or software interfaces that serves to facilitate communication and exchange of data between any number of or combination of equipment, protocol layers, or applications. For example, the data access interface 202 and output interface 221 may each include a network interface to communicate with other servers, devices, components or network elements via a network in the system 100.

Although applications described herein are directed mainly to creation and deployment of chatbots, it should be appreciated that that the systems may also use these and other various techniques in content-based recommendation engines, advertisements, market research, law enforcement, supply chain management and operations, dynamic risk analysis, and other types of knowledge management systems. The AI-based communications systems described herein may provide a more comprehensive, flexible and efficient approach to providing enhanced user experience and service using AI-based techniques.

What has been described and illustrated herein are examples of the disclosure along with some variations. The terms, descriptions, and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

The invention claimed is:
1. A system, comprising:
  one or more data stores to store and manage data within a network;
  one or more servers to facilitate operations using information from the one or more data stores;
  an artificial intelligence (AI) based communications system that communicates with the one or more servers and the one or more data stores in the network to create and manage an artificial conversational entity for a user, the AI-based communications system comprising:

a data access interface to:

receive instructions from a requester to create an artificial conversational entity, wherein the instructions comprise artificial conversational entity configuration details with a configurable feature comprising at least one of voice control, multilingual interface, auto-correction, auto-suggestion, auto-exclusion, multiple topic interaction, lifespan, or message application integration;

receive data from a data source, wherein the data source comprises at least one of a user-defined data source and a delimit data source;

a processor to:

generate an artificial conversational entity based on the instructions from the requestor and the data from the data source by:

identifying a data source type associated with the data from the data source;

performing data treatment on the data from the data source based on the data source type, wherein the data treatment focuses data on at least one targeted topic;

determining and applying a compression technique to the data from the data source based on data type;

performing an intellective computing technique on the data from the data source;

performing a synoptic evaluation of the data from the data source, including:

conducting an estimation of computer programming language libraries required to run the artificial conversational entity; and compiling the one or more data stores with required computer programming language libraries to run the artificial conversational entity; and generating an executable based on the synoptic evaluation, wherein the executable is associated with the artificial conversational entity to be presented to the user; and an output interface to transmit to a user device the artificial conversational entity.

2. The system of claim 1, wherein the data source comprises at least one of textual data, audio data, visual data.

3. The system of claim 1, wherein the data source comprises at least one of a website, a document, enterprise resource planning (ERP) system, a database, a web feed, a sensor, a geolocation data source, a server, an analytics tool, a mobile device, and a reporting system.

4. The system of claim 1, wherein the data treatment comprises at least one of parsing, natural language processing, relation extraction, translation, auto-correction, and data cleaning.

5. The system of claim 1, wherein the compression technique comprises performing data encryption to maintain accuracy and consistency of data.

6. The system of claim I, wherein generating the artificial conversational entity further comprises storing the data in one or more data stores.

7. The system of claim 1, wherein the intellective computing technique comprises:

translating user queries received from a user to meaningful information;

removing common keywords to understand intent of the user queries; and determining key search terms for responding to the user queries, wherein determining key search terms comprises at least one of tokenization, extraction, weighting keywords, relation extraction, and ranking potential responses to user queries.

8. A method for creating an artificial conversational entity, comprising:

receiving, at a data access interface, instructions from a requestor to create an artificial conversational entity, wherein the instructions comprise artificial conversational entity configuration details with a configurable feature comprising at least one of voice control, multilingual interface, auto-correction, auto-suggestion, auto-exclusion, multiple topic interaction, lifespan, or message application integration;

receiving data from a data source, wherein the data source comprises at least one of a user-defined data source and a default data source;

generating, at a processor, an artificial conversational entity based on the instructions from the requestor and the data from the data source by:

identifying a data source type associated with the data from the data source;

performing data treatment on the data from the data source based on the data source type, wherein the data treatment focuses data on at least one targeted topic;

determining and applying a compression technique to the data from the data source based on data type;

performing an intellective computing technique on the data from the data source;

performing a synoptic evaluation of the data from the data source, including:

conducting an estimation of computer programming language libraries required to run the artificial conversational entity; and compiling the one or more data stores with required computer programming language libraries to run the artificial conversational entity; and generating an executable based on the synoptic evaluation, wherein the executable is associated with the artificial conversational entity to be presented to the user interacting with the artificial conversational entity; and outputting, at an output interface, to a user device the artificial conversational entity with which to interact.

9. The method of claim 8, wherein the data source comprises at least one of a website, a document, enterprise resource planning (ERP) system, a database, a web feed, a sensor, a geolocation data source, a server, an analytics tool, a mobile device, and a reporting system.

10. The method of claim 8, wherein the data treatment comprises at least one of parsing, natural language processing, relation extraction, translation, auto-correction, and data cleaning.

11. The method of claim 8, wherein the compression technique comprises performing data encryption to maintain accuracy and consistency of data.

12. The method of claim 8, wherein the intellective computing technique comprises:

translating user queries to meaningful information;

removing common keywords to understand intent of the user queries; and determining key search terms for responding to the user queries, wherein determining key search terms comprises at least one of tokenization, extraction, weighting keywords, relation extraction, and ranking potential responses to user queries.

13. A non-transitory computer-readable storage medium having an executable stored thereon, which when executed instructs a processor to perform the following:
receiving instructions from a requestor to create an artificial conversational entity, wherein the instructions comprise artificial conversational entity configuration details with a configurable feature comprising at least one of voice control, multilingual interface, auto-correction, auto-suggestion, auto-exclusion, multiple topic interaction, lifespan, or message application integration;
receiving data from a data source, wherein the data source comprises at least one of a user-defined data source and a default data source;
generating an artificial conversational entity based on the instructions from the requestor and the data from the data source by:
identifying a data source type associated with the data from the data source;
performing data treatment on the data from the data source based on the data source type, wherein the data treatment focuses data on at least one targeted topic;
determining and applying a compression technique to the data from the data source based on data type;
performing an intellective computing technique on the data from the data source;
performing a synoptic evaluation of the data from the data source, including:
conducting an estimation of computer programming language libraries required to run the artificial conversational entity; and
compiling the one or more data stores with required computer programming language libraries to run the artificial conversational entity; and
generating an executable based on the synoptic evaluation, wherein the executable is associated with the artificial conversational entity to be presented to the user interacting with the artificial conversational entity; and
outputting to a user device the artificial conversational entity with which to interact.

14. A method for providing an artificial conversational entity, comprising:
presenting, via an output interface, to a user at a user device an artificial conversational entity;
receiving, at a data access interface via the artificial conversational entity, at least one user query from the user;
receiving data from a data source, wherein the data source comprises at least one of a user-defined data source and a default data source, and wherein the artificial conversational entity is generated, via a processor, at least in part based on the data source, wherein the artificial conversational entity has a configurable feature comprising at least one of voice control, multilingual interface, auto-correction, auto-suggestion, auto-exclusion, multiple topic interaction, lifespan, or message application integration;
present, at the output interface via the artificial conversational entity to the user at the user device, at least one response to the at least one user queries, wherein the at least one response is generated by:
identifying a data source type associated with the data from the data source;
performing data treatment on the data from the data source based on the data source type, wherein the data treatment focuses data on at least one targeted topic;
performing an intellective computing technique on the data from the data source to identify intent of the at least query;
performing a synoptic evaluation of the data from the data source, including:
conducting an estimation of computer programming language libraries required to run the artificial conversational entity; and
compiling the one or more data stores with required computer programming language libraries to run the artificial conversational entity; and
generate the at least one response based on the identified intent and the received data using at least one of: stemming, tokenization, stop word removal, n-grams, extraction, vectorization, knowledge graphs, cosine similarity, algorithmic scoring, JSON creation, and entity relations.

15. The method of claim 14, wherein the data source comprises at least one of a website, a document, enterprise resource planning (ERP) system, a database, a web feed, a sensor, a geolocation data source, a server, an analytics tool, a mobile device, and a reporting system.

16. The method of claim 14, wherein the data treatment comprises at least one of parsing, natural language processing, relation extraction, translation, auto-correction, and data cleaning.

17. The method of claim 14, wherein the intellective computing technique comprises:
translating user queries received from a user interacting with the artificial conversational entity to meaningful information;
removing common keywords to understand intent of user queries; and
determining key search terms for responding to user queries, wherein determining key search terms comprises at least one of tokenization, extraction, weighting keywords, relation extraction, and ranking potential responses to user queries.

18. A non-transitory computer-readable storage medium having an executable stored thereon, which when executed instructs a processor to perform the following:
presenting to a user at a user device an artificial conversational entity;
receiving, via the artificial conversational entity, at least one user query from the user;
receiving data from a data source, wherein the data source comprises at least one of a user-defined data source and a default data source, and wherein the artificial conversational entity is generated, via a processor, at least in part based on the data source, wherein the artificial conversational entity has a configurable feature comprising at least one of voice control, multilingual interface, auto-correction, auto-suggestion, auto-exclusion, multiple topic interaction, lifespan, or message application integration;
present, via the artificial conversational entity to the user at the user device, at least one response to the at least one user queries, wherein the at least one response is generated by:
identifying a data source type associated with the data from the data source;

performing data treatment on the data from the data source based on the data source type, wherein the data treatment focuses data on at least one targeted topic;

performing an intellective computing technique on the data from the data source to identify intent of the at least query; and performing a synoptic evaluation of the data from the data source, including:
- conducting an estimation of computer programming language libraries required to run the artificial conversational entity; and
- compiling the one or more data stores with required computer programming language libraries to run the artificial conversational entity:

generate the at least one response based on the identified intent and the received data using at least one of: stemming, tokenization, stop word removal, n-grams, extraction, vectorization, knowledge graphs, cosine similarity, algorithmic scoring, JSON creation, and entity relations.

19. The non-transitory computer-readable storage medium of claim 18, wherein the data source comprises at least one of a website, a document, enterprise resource planning (ERP) system, a database, a web feed, a sensor, a geolocation data source, a server, an analytics tool, a mobile device, and a reporting system.

20. The non-transitory computer-readable storage medium of claim 18, wherein the data treatment comprises at least one of parsing, natural language processing, relation extraction, translation, auto-correction, and data cleaning.

* * * * *

UNITED STATES PATENT AND TRADEMARK OFFICE
CERTIFICATE OF CORRECTION

PATENT NO. : 11,361,211 B2
APPLICATION NO. : 16/013612
DATED : June 14, 2022
INVENTOR(S) : Hemant Manaharlal Kakkad, Richa Gupta and Nitin Kumar Gupta It is certified that error appears in the above-identified patent and that said Letters Patent is hereby corrected as shown below:

In the Claims

At Claim 1, Column 17, Line 2, the phrase "the AI-based" should instead read "the artificial intelligence (AI) based".
At Claim 1, Column 17, Line 4, the phrase "from a requester" should instead read "from a requestor".
At Claim 1, Column 17, Line 11, the phrase "application integration;" should instead read "application integration; and".
At Claim 1, Column 17, Line 14, the phrase "a delimit data source" should instead read "a default data source".
At Claim 6, Column 17, Line 57, the phrase "claim I" should instead read "claim 1".
At Claim 8, Column 18, Line 37, the phrase "conversational entity; and" should instead read "conversational entity;".
At Claim 13, Column 19, Line 37, the phrase "conversational entity; and" should instead read "conversational entity;".
At Claim 14, Column 19, Line 62, the phrase "present, at the output" should instead read "presenting, at the output".
At Claim 14, Column 20, Line 16, the phrase "generate the at least one" should instead read "generating the at least one".
At Claim 18, Column 20, Line 62, the phrase "present, via the artificial" should instead read "presenting, via the artificial".
At Claim 18, Column 21, Line 15, the phrase "conversational entity:" should instead read "conversational entity; and".
At Claim 18, Column 21, Line 16, the phrase "generate the at least one" should instead read "generating the at least one".

Signed and Sealed this
First Day of August, 2023

Katherine Kelly Vidal
*Director of the United States Patent and Trademark Office*